(12) United States Patent
Busquets et al.

(10) Patent No.: US 12,435,711 B2
(45) Date of Patent: Oct. 7, 2025

(54) INTEGRATED ELECTRO-HYDRAULIC UNIT HOUSING

(71) Applicant: Robert Bosch GmbH, Stuttgart (DE)

(72) Inventors: Enrique Busquets, Greer, SC (US); Andreas Guender, Lohr am Main (DE)

(73) Assignee: Robert Bosch GmbH, Stuttgart (DE)

(*) Notice: Subject to any disclaimer, the term of this patent is extended or adjusted under 35 U.S.C. 154(b) by 149 days.

(21) Appl. No.: 18/465,819

(22) Filed: Sep. 12, 2023

(65) Prior Publication Data
US 2025/0084837 A1 Mar. 13, 2025

(51) Int. Cl.
F04B 17/03 (2006.01)
F04B 1/2028 (2020.01)
F04B 1/2064 (2020.01)
F04B 1/2071 (2020.01)
F04B 1/2085 (2020.01)
F04B 53/16 (2006.01)
F04B 53/22 (2006.01)
H02K 5/04 (2006.01)
F01B 23/10 (2006.01)
F01B 31/26 (2006.01)

(52) U.S. Cl.
CPC ............ F04B 17/03 (2013.01); F04B 1/2028 (2013.01); F04B 1/2064 (2013.01); F04B 1/2071 (2013.01); F04B 1/2085 (2013.01); F04B 53/16 (2013.01); F04B 53/22 (2013.01); H02K 5/04 (2013.01); F01B 23/10 (2013.01); F01B 31/26 (2013.01)

(58) Field of Classification Search
CPC ...... F04B 17/03; F04B 1/2028; F04B 1/2064; F04B 1/2071; F04B 1/2085; F04B 53/16; F04B 53/22; H02K 5/04; H02K 7/14; F01B 23/10; F01B 31/26
USPC ............................................. 417/271
See application file for complete search history.

(56) References Cited

U.S. PATENT DOCUMENTS 1,849,222 A 3/1932 Canton
3,295,457 A 1/1967 George
(Continued)

FOREIGN PATENT DOCUMENTS

CN 102536722 B 9/2014
CN 103437975 B 11/2015
(Continued)

Primary Examiner — Charles G Freay
(74) Attorney, Agent, or Firm — Michael Best & Friedrich LLP

(57) ABSTRACT

An integrated electro-hydraulic unit has a hydraulic machine, an electric machine encircling the hydraulic machine and a housing at least partially surrounding the electric machine and the hydraulic machine. The hydraulic machine includes a rotary working group configured to pump a fluid. The electric machine includes a stator and a rotor coupled to the rotary working group such that the rotor drives the rotary working group. The housing includes a front cap and an end cap each having a plurality of tie rod openings. The housing includes a plurality of tie rods and a housing shell encircling the electric machine and positioned between the front and end caps. The tie rods extend through the openings in the front cap and end cap. Nuts are tightened on the tie rods such that the front cap, the end cap, and the housing shell are compressed via tension in the tie rods.

19 Claims, 12 Drawing Sheets

(56) References Cited

U.S. PATENT DOCUMENTS

| | | | |
|---|---|---|---|
| 3,999,895 A * | 12/1976 | Boyle | F04B 1/122 |
| | | | 417/338 |
| 4,075,843 A | 2/1978 | Leker | |
| 4,529,362 A | 7/1985 | Ichiryu et al. | |
| 4,729,717 A | 3/1988 | Gupta | |
| 4,734,013 A * | 3/1988 | Valavaara | F04B 9/1115 |
| | | | 417/387 |
| 4,850,812 A | 7/1989 | Voight | |
| 5,105,723 A | 4/1992 | Kazahaya et al. | |
| 5,141,402 A | 8/1992 | Bloomquist et al. | |
| 5,220,225 A | 6/1993 | Moon, Jr. | |
| 5,354,182 A | 10/1994 | Niemiec et al. | |
| 5,591,013 A * | 1/1997 | Kawafune | F04B 1/20 |
| | | | 417/271 |
| 6,361,285 B1 | 3/2002 | Lehner | |
| 6,769,745 B2 | 8/2004 | Mohr et al. | |
| 7,182,583 B2 * | 2/2007 | Gandrud | H02K 7/14 |
| | | | 417/32 |
| 8,358,042 B2 | 1/2013 | Yamada et al. | |
| 9,175,672 B2 | 11/2015 | Ohno et al. | |
| 10,215,226 B2 * | 2/2019 | Matsuo | F16C 19/364 |
| 10,677,207 B2 | 6/2020 | Ashton et al. | |
| 11,255,359 B2 | 2/2022 | Jagoda et al. | |
| 12,031,559 B1 * | 7/2024 | Busquets | F04B 1/128 |
| 2002/0153768 A1 | 10/2002 | Mohr et al. | |
| 2005/0175479 A1 | 8/2005 | Gandrud et al. | |
| 2011/0001370 A1 | 1/2011 | Yamada et al. | |
| 2013/0315758 A1 | 11/2013 | Olson | |
| 2020/0256336 A1 | 8/2020 | Terzo et al. | |
| 2022/0166284 A1 | 5/2022 | Busquets et al. | |

FOREIGN PATENT DOCUMENTS

| | | |
|---|---|---|
| CN | 106089624 A | 11/2016 |
| CN | 106286195 A | 1/2017 |
| DE | 19650270 A1 | 6/1998 |
| DE | 102007058858 A1 | 6/2009 |
| EP | 0578390 A1 | 1/1994 |
| EP | 0611887 A1 | 8/1994 |
| EP | 0819848 B1 | 6/2003 |
| EP | 1462647 A2 | 9/2004 |
| EP | 1536139 A1 | 6/2005 |
| EP | 0932773 B1 | 3/2006 |
| EP | 1669599 A1 | 6/2006 |

* cited by examiner

INTEGRATED ELECTRO-HYDRAULIC UNIT HOUSING

BACKGROUND

The present invention relates generally to the field of electrically driven hydraulic pumps, commonly referred to as ePumps. Specifically, the present invention relates to the field of housings for integrated electro-hydraulic units.

SUMMARY

The present invention provides, in one aspect, an integrated electro-hydraulic unit having a hydraulic machine, an electric machine encircling the hydraulic machine and a housing at least partially surrounding the electric machine and the hydraulic machine. The hydraulic machine includes a rotary working group configured to pump a working fluid. The electric machine includes a stator and a rotor coupled to the rotary working group such that the rotor drives the rotary working group. The housing includes a front cap having a front plate with a plurality of first tie rod openings positioned therewithin, an end cap having an end plate with a plurality of second tie rod openings positioned therewithin, and a housing shell encircling the electric machine and positioned between the front cap and the end cap. The housing further includes a plurality of tie rods. Each tie rod has a first threaded end extending through a respective one of the plurality of first tie rod openings and a second end extending through a respective one of the plurality of second tie rod openings. The housing further has a first plurality of nuts threaded onto each of the first threaded ends of the plurality of tie rods and tightened onto the front cap such that the front cap, the end cap, and the housing shell are compressed via tension in the plurality of tie rods.

The present invention provides, in another aspect, an integrated electro-hydraulic unit having a hydraulic machine including a rotary working group configured to pump a working fluid, an electric machine encircling the hydraulic machine, and a housing at least partially surrounding the electric machine and the hydraulic machine. The electric machine includes a stator and a rotor coupled to the rotary working group such that the rotor drives the rotary working group about an axis. The housing includes a front cap, an end cap and a housing shell extending between the front cap and the end cap. The front cap has a front plate defining a first outer axial surface and a first inner axial surface opposite the first outer axial surface. The end cap has an end plate defining a second outer axial surface and a second inner axial surface opposite the second outer axial surface. The second inner axial surface faces the first inner axial surface of the front cap. The housing shell has a first axial end abutting the first inner axial surface and a second axial end abutting the second inner axial surface.

The present invention provides, in one aspect, an integrated electro-hydraulic unit having an electric machine including a stator and a rotor, a hydraulic machine, and a housing. The hydraulic machine has a shaft, a bearing supporting the shaft, a cylinder block driven about an axis by the rotor and coupled to the shaft, a plurality of pistons received in the cylinder block, a swashplate configured to axially move plurality of pistons, and a valve plate including a plurality of ports. The plurality of ports include a first port and a second port. Each of the first and second ports is configured to exchange a working fluid with the cylinder block by action of the plurality of pistons. The housing has a front cap having a front plate and a projection extending from the front plate, an end cap having an end plate and a protrusion extending from the end plate, and a housing shell encircling the electric machine and sandwiched between the front cap and the end cap. The projection defines a projection distal end which abuts the swashplate. The protrusion defines a protrusion distal end in which a bearing recess is formed. The bearing is positioned in the bearing recess of the protrusion such that the protrusion supports the bearing and the shaft.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
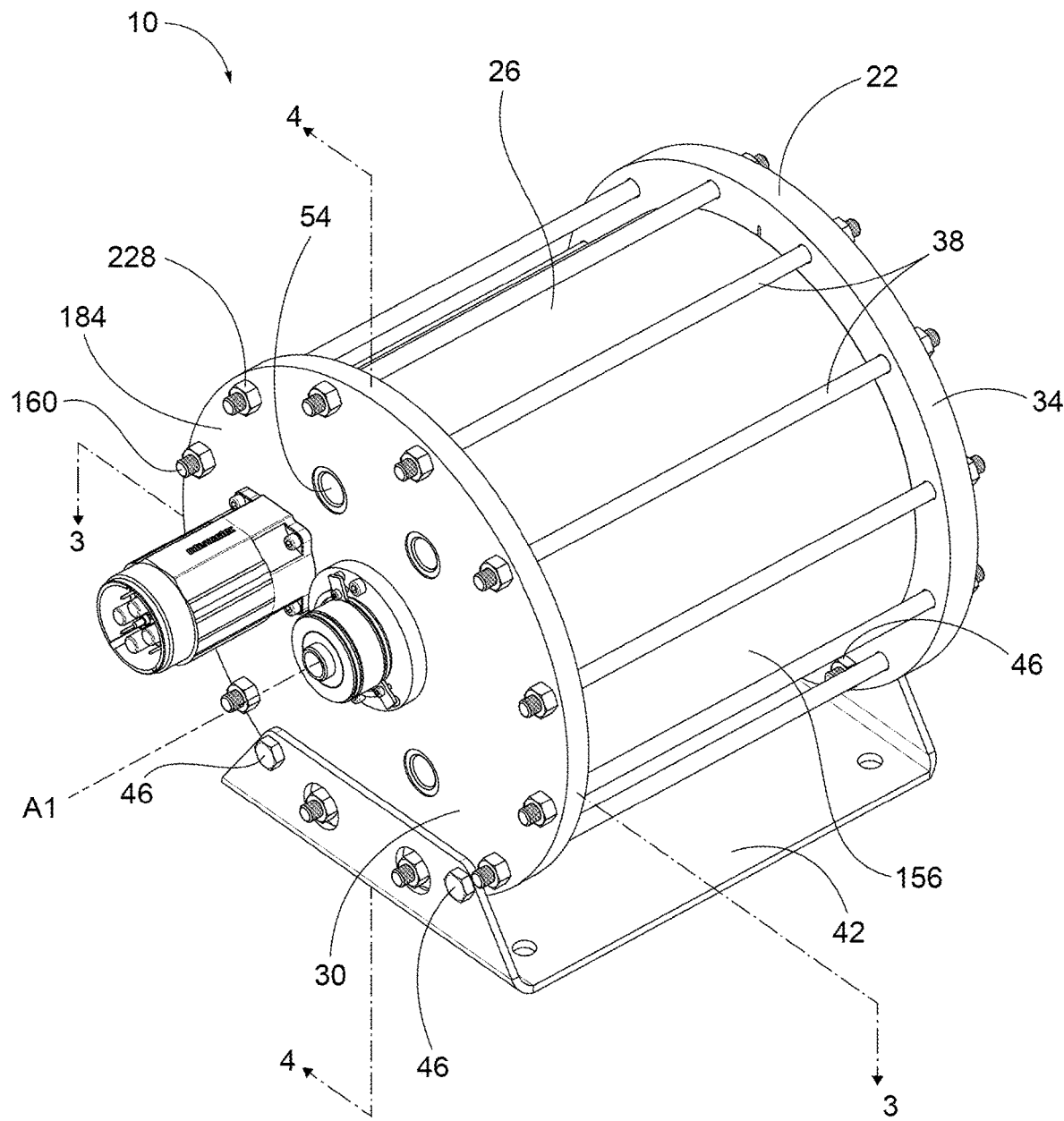
FIG. 1 is a front perspective view of an integrated electro-hydraulic unit.
Figure 2:
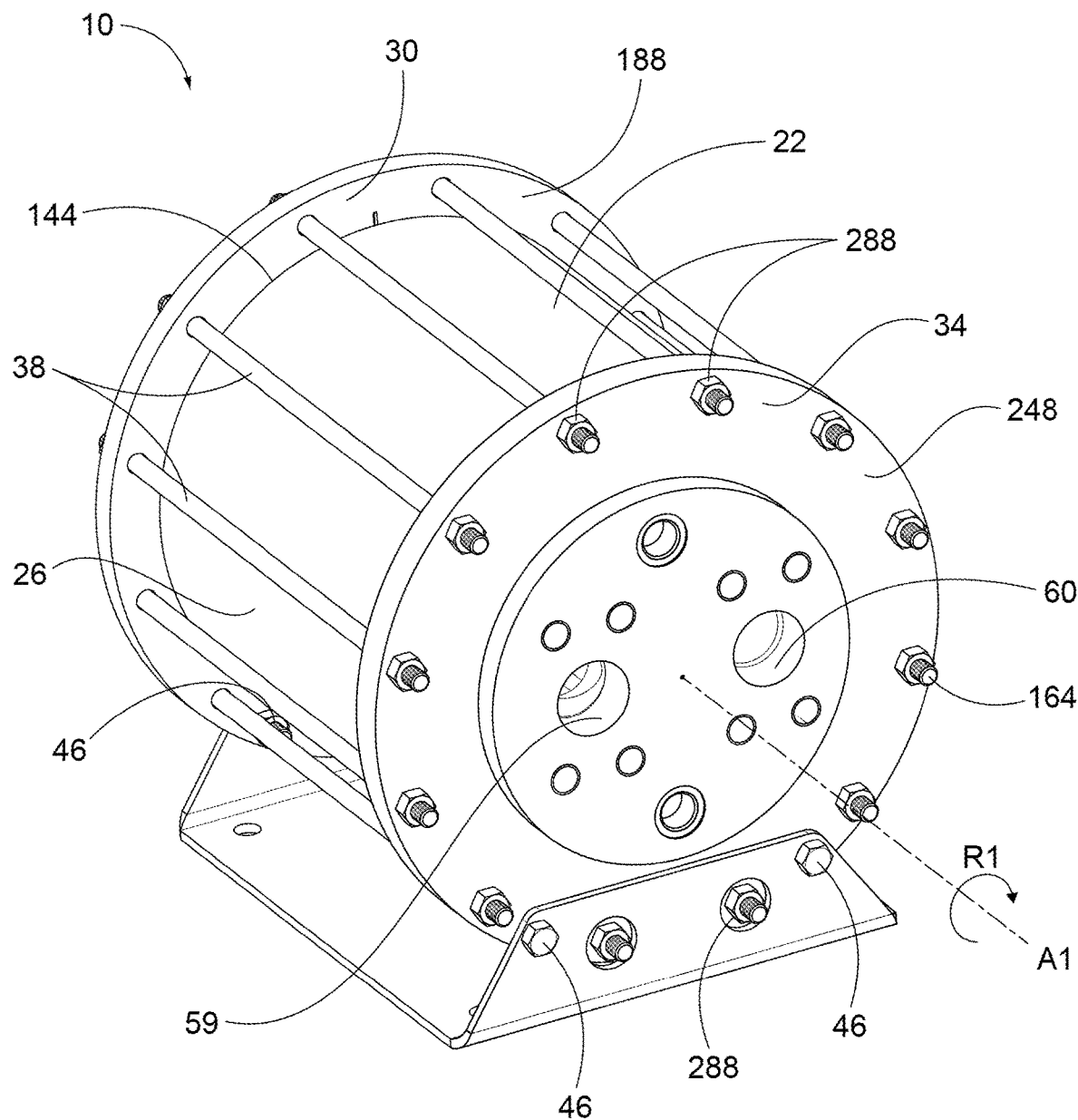
FIG. 2 is a rear perspective view of the integrated electro-hydraulic unit of FIG. 1.
Figure 3:
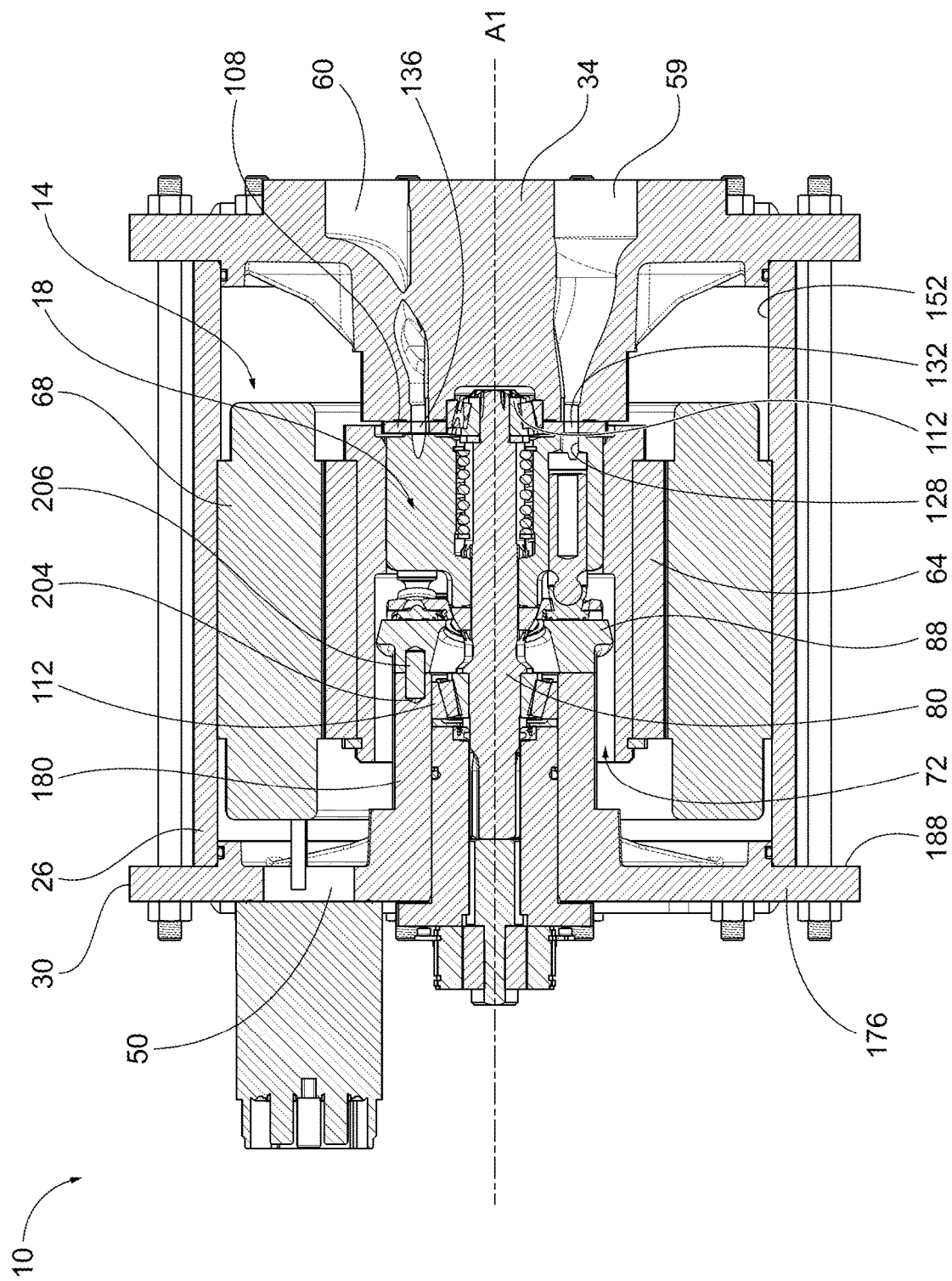
FIG. 3 is a top cross-section of the integrated electro-hydraulic unit taken along line 3-3 of FIG. 1.
Figure 4:
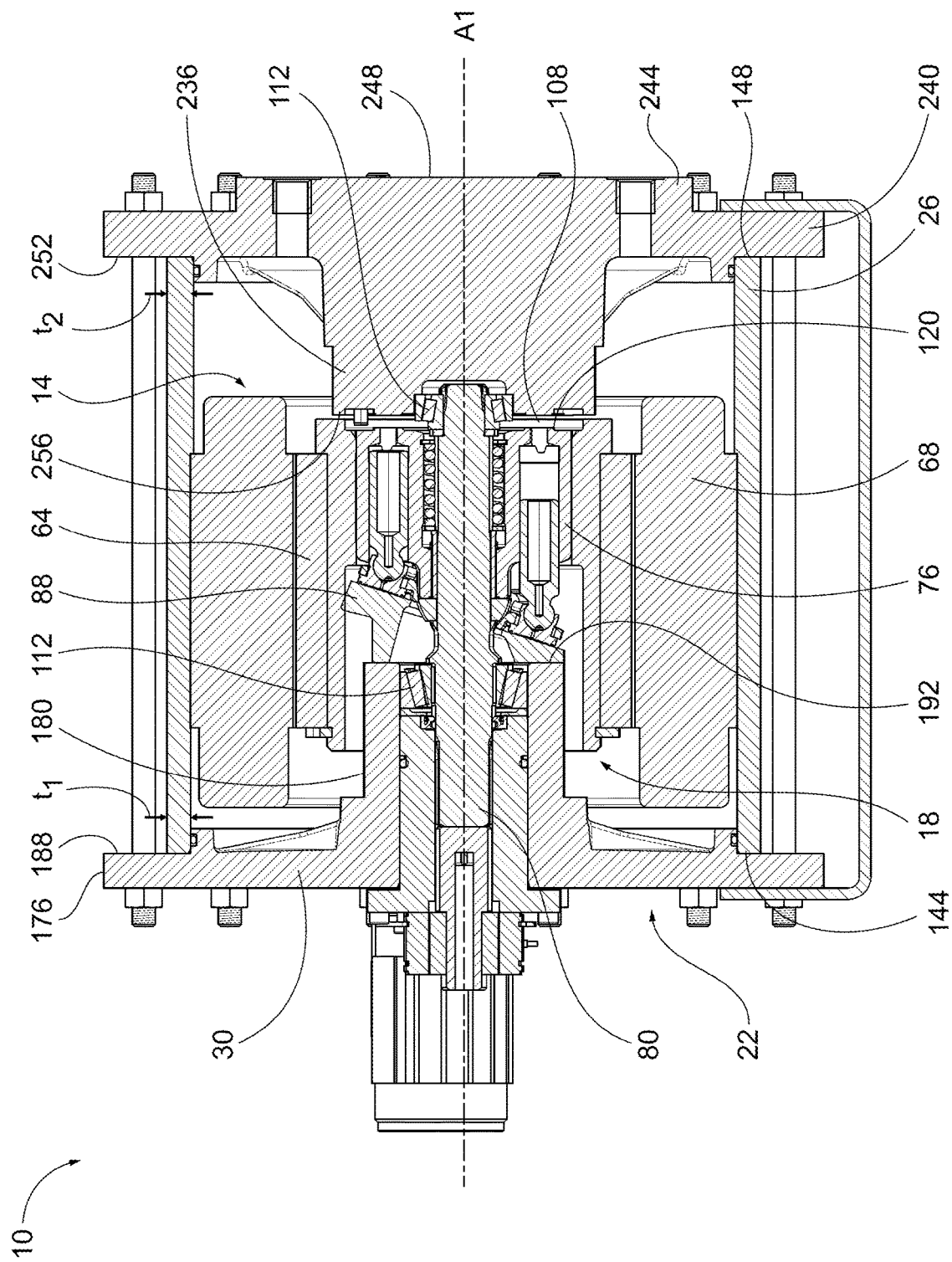
FIG. 4 is a side cross-section of the integrated electro-hydraulic unit taken along line 4-4 of FIG. 1.

FIGS. 1-4 illustrate an integrated electro-hydraulic unit 10 according to one construction of the present disclosure. The integrated electro-hydraulic unit 10 includes an electric machine 14, a hydraulic machine 18, and a housing 22 as illustrated in FIGS. 3 and 4. The integrated electro-hydraulic unit 10 integrates the electric machine 14 and the hydraulic machine 18 such that they can interchangeably transfer mechanical power into fluid power known as pumping. In addition to pumping, the integrated electro-hydraulic unit 10 can also transfer the fluid power into mechanical power. In other words, the hydraulic machine, or "pump," has the capability of pumping, but also the capability of motoring. The capability of switching between pumping and motoring is possible by reversing a rotational direction of the electric machine 14. A unit capable of pumping and motoring is commonly referred to as a two-quadrant unit in the art. In some constructions, the integrated electro-hydraulic unit 10 may include an additional integrated electro-hydraulic unit having a housing separate from the integrated electro-hydraulic unit 10. In other constructions, multiple electro-hydraulic units may share the same housing 22. In some constructions, multiple electro-hydraulic units can be stacked together on a common shaft. Stacked electro-hydraulic units work with a single inverter.

With reference to FIGS. 1 and 2, the housing 22 includes a housing shell 26, or radial casing, a front cap 30, or swashplate end case, and an end cap 34, or porting end case. The housing shell 26 is sandwiched between the front cap 30 and the end cap 34. Tie rods 38 extend transverse to the front cap 30 and end cap 34 and parallel to a shared rotational, or central, axis A1 of the electric machine 14 and the hydraulic machine 18. The tie rods 38 secure the front cap 30 and the end cap 34 to each other with the housing shell 26 therebetween. The housing shell 26, the front cap 30 and the end cap 34 form a singular shared interior cavity for both the electric machine 14 and the hydraulic machine 18, as discussed in further detail below. Specifically, the housing 22 collectively surrounds both the electric machine 14 and the hydraulic machine 18. The housing 22 may be coupled to a bracket 42 via fasteners 46 on the front cap 30 and the end cap 34. In some constructions, the housing 22 may be coupled to a plurality of brackets via the fasteners 46 on the front cap 30 and the end cap 34.

Figure 8:
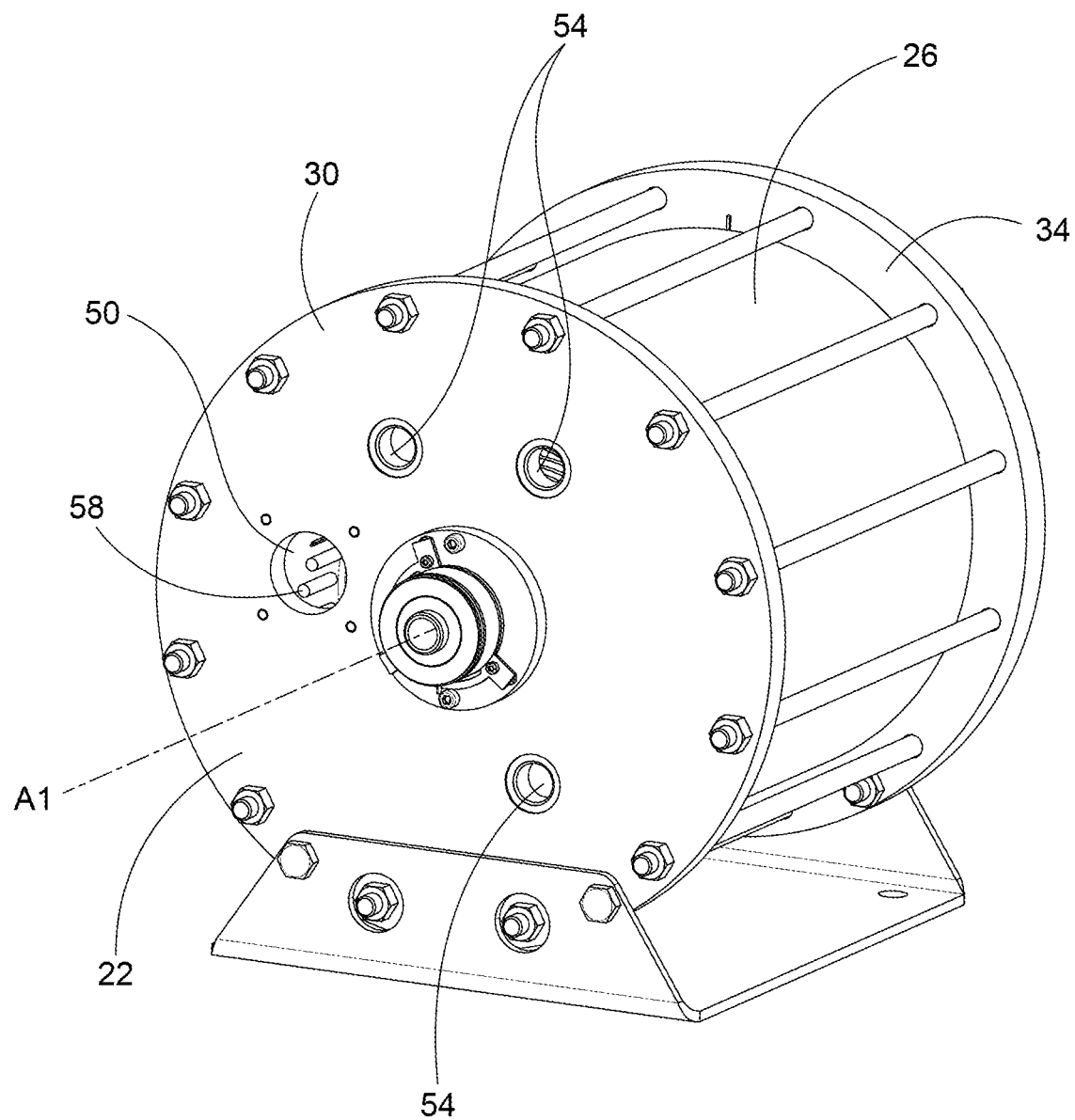
FIG. 8 is a front perspective view of the integrated electro-hydraulic unit of FIG. 1, with an electrical connector removed.

With reference to FIG. 8, the front cap 30 has an electrical connection aperture 50 and a plurality of drain ports 54. In other constructions, the front cap 30 may include only one drain port 54. In some constructions, the housing shell 26 may include the drain ports or the single drain port. The electrical connection aperture 50 accommodates the routing of wires 58 to the electric machine 14. The wires 58 provide power to the electric machine 14. As illustrated in FIGS. 2 and 3, the end cap 34 includes a first fluid opening 59 and a second fluid opening 60. The first fluid opening 59 is an inlet, and the second fluid opening 60 is an outlet. The housing 22 fluidly seals the electric machine 14 and the hydraulic machine 18. In one embodiment, the first opening 59, the second opening 60, and the drain port 54 are the only locations where the working fluid can enter and leave the housing 22.

As shown in FIGS. 3 and 4, the hydraulic machine 18 is nested within the electric machine 14 such that the electric machine 14 encircles the hydraulic machine 18. The electric machine 14 can be a motor of any suitable topology including, but not limited to, induction, surface permanent magnet, internal permanent magnet, wound rotor, and switched reluctance. The electric machine 14 includes a rotor 64 and a stator 68 with a winding. The stator 68 is located most proximal to the housing shell 26 of the housing 22. The rotor 64 is located radially inward towards the axis A1 from the stator 68. Both the rotor 64 and the stator 68 encircle the hydraulic machine 18.

Figure 5:
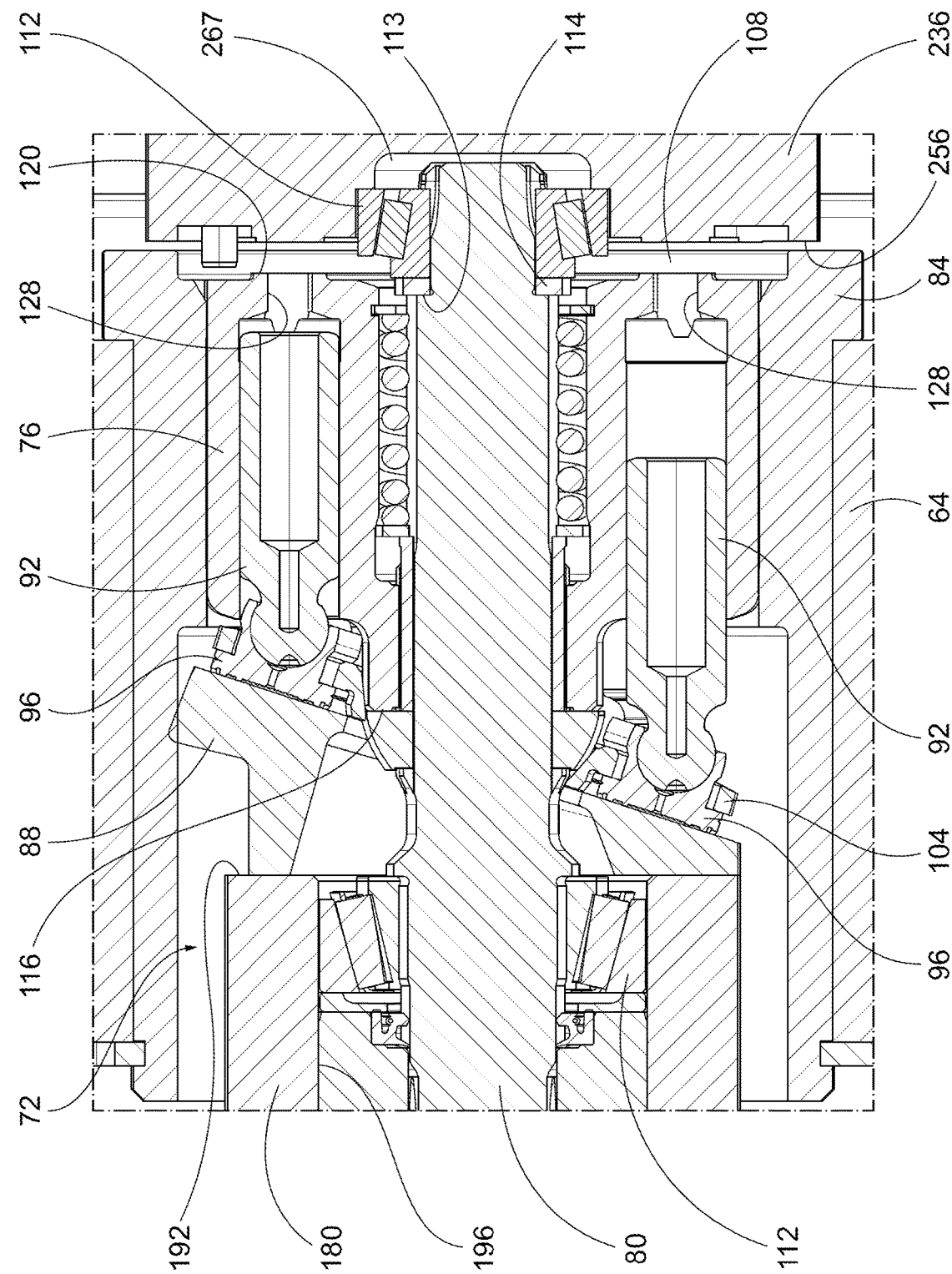
FIG. 5 is a first enlarged cross-section view of the integrated electro-hydraulic unit taken along line 4-4 of FIG. 1.

As illustrated in FIGS. 3-5, the hydraulic machine 18 may be an axial piston machine of swashplate type. In other constructions, the hydraulic machine 18 can be a bent axis pump, which operates on the same principles but lacks a movable swashplate. The hydraulic machine 18 includes a rotary working group 72 which operates on the working fluid. The rotary group 72 includes a cylinder block 76, a shaft 80, a drive flange 84, a swashplate 88, a plurality of pistons 92, a plurality of slippers 96, a retaining plate 104 and a valve plate 108. The cylinder block 76 is rotatably supported by the shaft 80 about the axis A1 on bearings 112. The shaft 80 includes a reduced cross-section which forms a ledge 113. A washer 114 (FIG. 5) is positioned between a portion of the shaft 80 and the bearing 112 such that the shaft 80 is placed at a defined axial position relative to the bearing 112. Specifically, the washer 114 is positioned between a ledge 113 of the shaft 80 and the bearing 112—in particular, an inner race thereof. The cylinder block 76 is rotatable about the axis A1 in a first rotational direction R1. The cylinder block 76 has a first end 116 proximal to the front cap 30 and a second end 120 proximal to the end cap 34. The second end 120 includes a plurality of slots 128 circumferentially located around the axis A1. Each of the slots 128 is identical in shape. The drive flange 84 is located between the cylinder block 76 and the rotor 64 and rotatably couples the cylinder block 76 to the rotor 64. The swashplate 88 is located along the axis A1 and is in contact with the plurality of slippers 96 towards the first end 116 of the cylinder block 76. The plurality of pistons 92 are received in the cylinder block 76 radially around the axis A1. The valve plate 108 is located along the axis A1 and between the second end 120 of the cylinder block 76 and the end cap 34, as best shown in FIG. 4.

Figure 9:
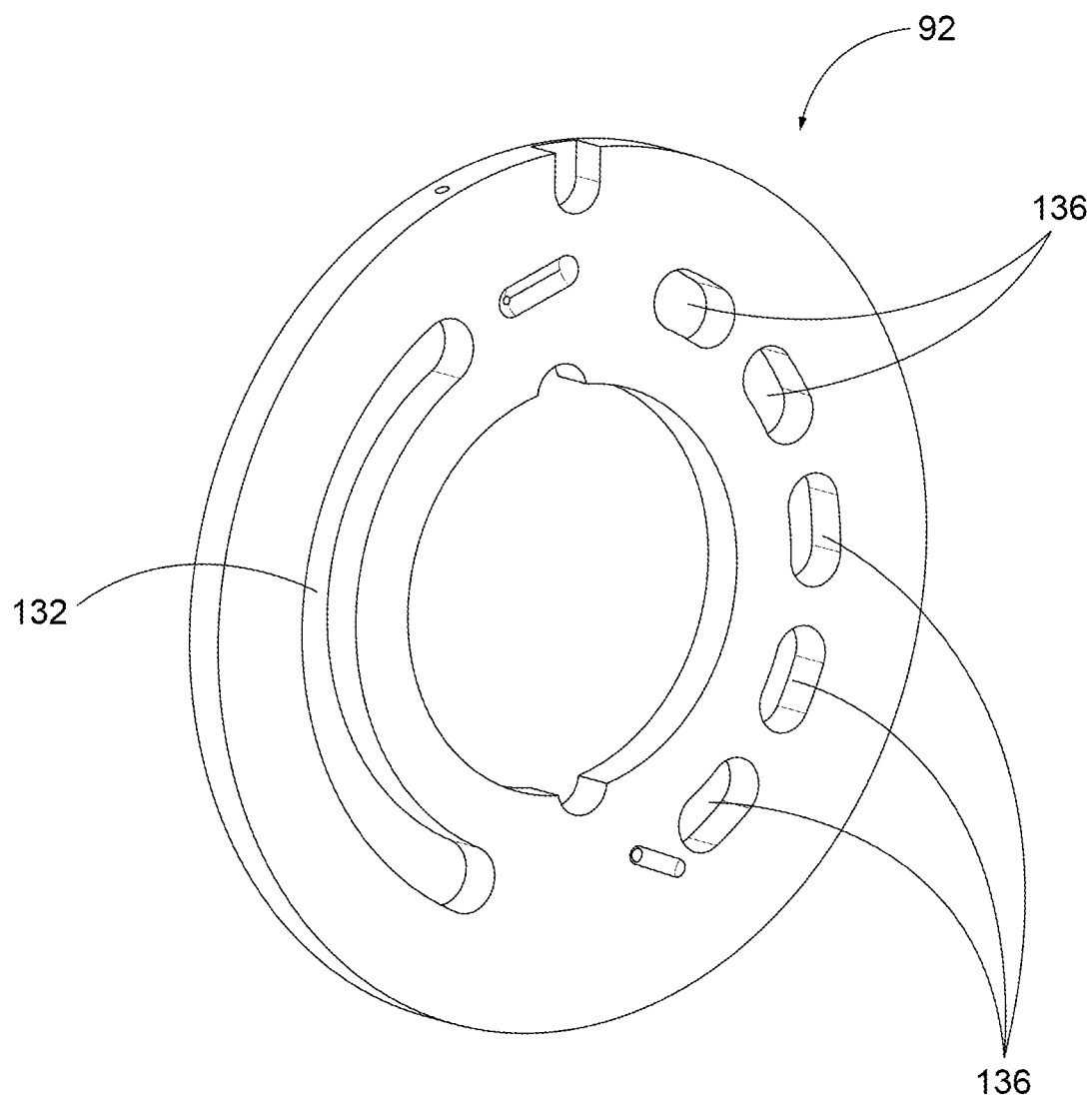
FIG. 9 is a perspective view of a valve plate of the integrated electro-hydraulic unit of FIG. 1.

As shown in FIG. 9, the valve plate 108 includes a first port 132 and a plurality of second ports 136. In some constructions, the plurality of second ports 136 may be combined to form a single second port. In some constructions, the valve plate 108 may include a third port in fluid communication with a cooling pipe. With reference to FIG. 3, the valve plate 108 is sandwiched between the second end 120 of the cylinder block 76 and the end cap 34. The first port 132 is in fluid communication with the first fluid opening 59 of the end cap 34 and with the plurality of slots 128 of the cylinder block 76. The second port 136 is in fluid communication with the second fluid opening 60 of the end cap 34 and with the plurality of slots 128 of the cylinder block 76.

The cylinder block 76 is configured to rotate clockwise around the axis A1 in the first rotational direction R1 as shown in FIG. 2. With reference to FIG. 5, during movement in the first rotational direction R1 of the cylinder block 76, each of the plurality of pistons 92 move in a reciprocating movement from the second end 120 of the cylinder block 76, known as a top dead center, towards the first end 116 of the cylinder block 76, known as the bottom dead center. As each of the plurality of pistons 92 moves away from the top dead center towards the bottom dead center during the first rotational direction R1, each of the plurality of pistons 92 pulls the working fluid through the first port 132 and into the cylinder block 76. As each of the plurality of pistons 92 moves away from the bottom dead center and towards the top dead center, each of the plurality of pistons 92 pushes the working fluid out of the cylinder block 76. In some constructions, all of the pumped working fluid is pushed out of the rotary working group 72 through the second ports 136. In other constructions, a first portion of the pumped working fluid is pushed out of the rotary working group 72 through the second ports 136, and a second portion of the pumped working fluid, a cooling flow, is pushed out of the rotary working group 72 through a third port of the valve plate 92, separate from the first portion at the second ports 136 (e.g., not mixed or conjoined together therewith).

Figure 6:
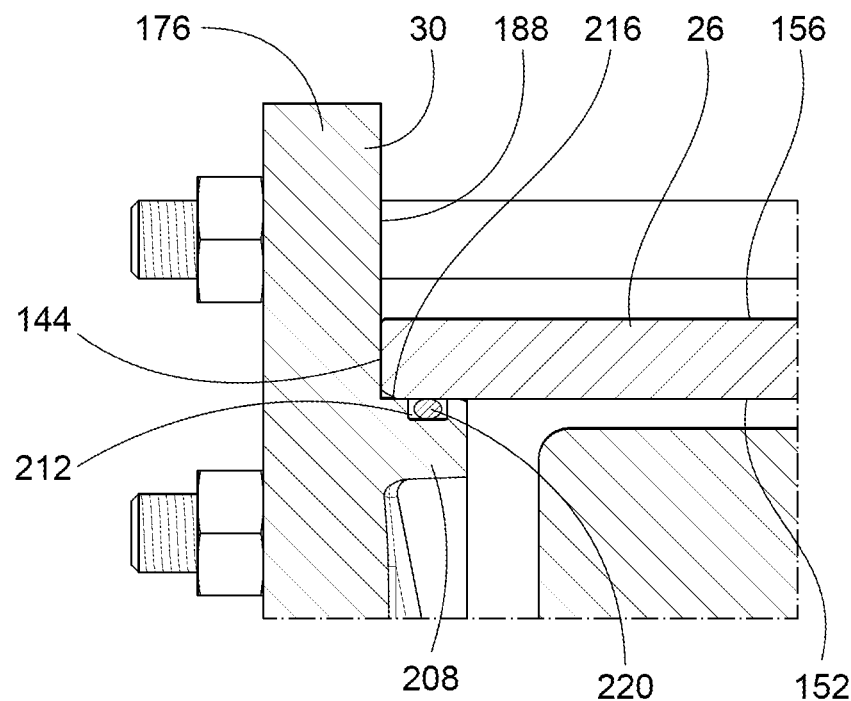
FIG. 6 is a second enlarged cross-section view of the integrated electro-hydraulic unit taken along line 4-4 of FIG. 1.
Figure 7:
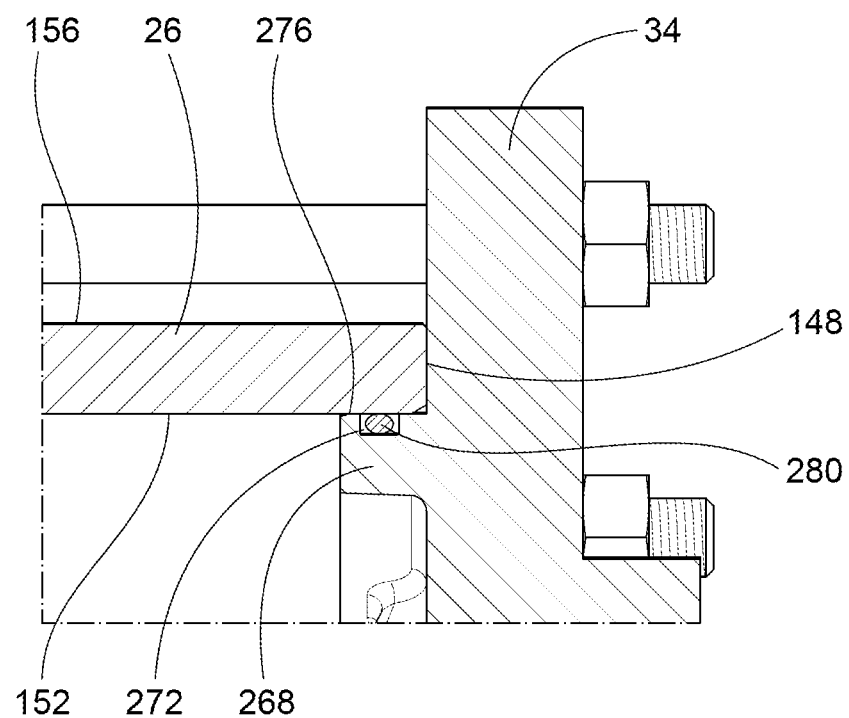
FIG. 7 is a second enlarged cross-section view of the integrated electro-hydraulic unit taken along line 4-4 of FIG. 1.
Figure 10:
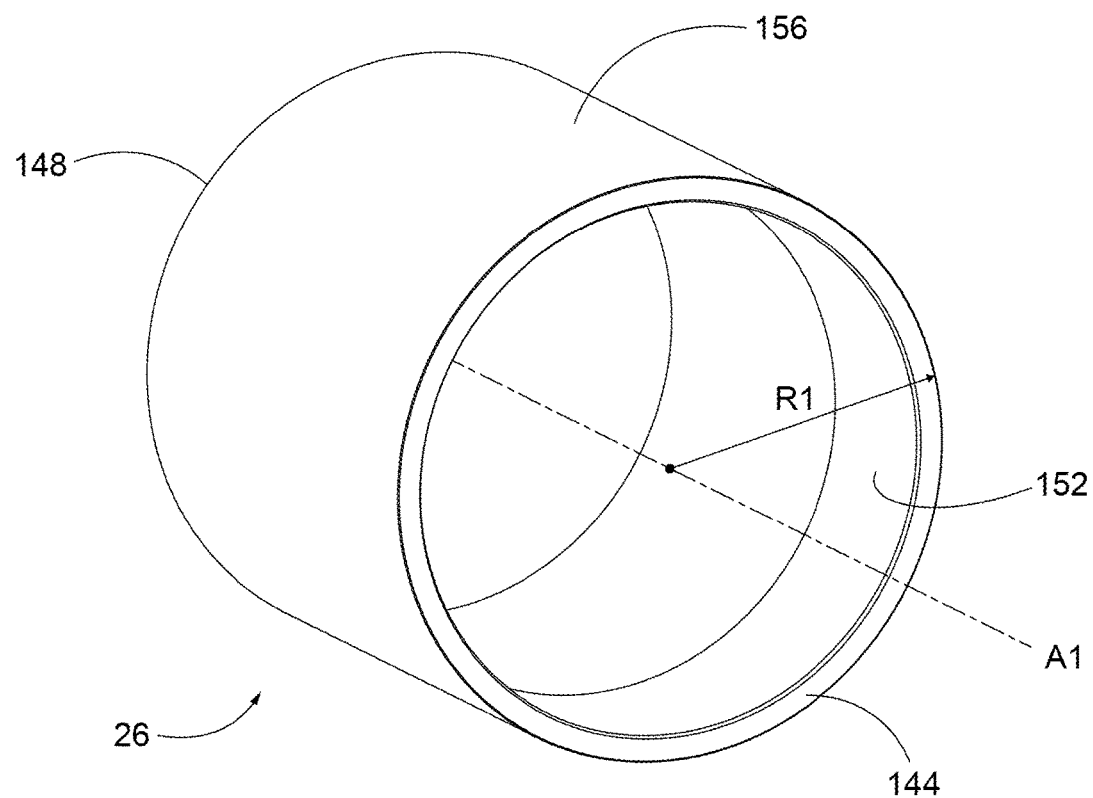
FIG. 10 is a perspective view of a housing shell of the integrated electro-hydraulic unit of FIG. 1.

As shown in FIGS. 6, 7 and 10, the housing shell 26 is a hollow cylinder. The housing shell 26 is formed from a non-magnetic material. For example, the housing shell 26 may be formed from aluminum or stainless steel. In some constructions, the housing shell 26 may be produced by continuous casting. The housing shell 26 is coaxial with the shared rotational axis A1, as shown in FIGS. 3 and 4. As illustrated in FIGS. 6, 7 and 10, the housing shell 26 includes a first axial end 144 which abuts the front cap 30 and a second axial end 148 which is opposite the first axial end 144 and which abuts the end cap 34. Accordingly, the first axial end 144 and the second axial end 148 of the housing shell 26 define the distance between the end cap 34 and the front cap 30. In other words, the housing shell 26 is machined to realize an exact distance between the front cap 30 and the end cap 34. Further, as shown in FIG. 4, the housing shell 26 has a first thickness $t_1$ at the first axial end 144 and a second thickness $t_2$ at the second axial end 148. In the illustrated construction, the first thickness $t_1$ is smaller than the second thickness $t_2$ to accommodate the stator 68. In other constructions, the second thickness $t_2$ may be equal to the first thickness $t_1$. In other constructions, the second thickness $t_2$ may be smaller than the first thickness $t_1$ to accommodate the stator 68. As illustrated, the majority of the housing shell 26 has the smaller thickness, or the first thickness $t_1$. With reference to FIGS. 3 and 10, the housing shell 26 further includes an inner circumferential surface 152 extending from the first axial end 144 and the second axial end 148 and defining a cavity which receives the hydraulic machine 18 and the electric machine 14. The housing shell 26 has an outer circumferential surface 156 which is opposite the inner circumferential surface 152 and extends between the first axial end 144 and the second axial end 148. The housing shell 26 has a first radius R1 which is an outer radius of the housing shell 26.

Figure 11:
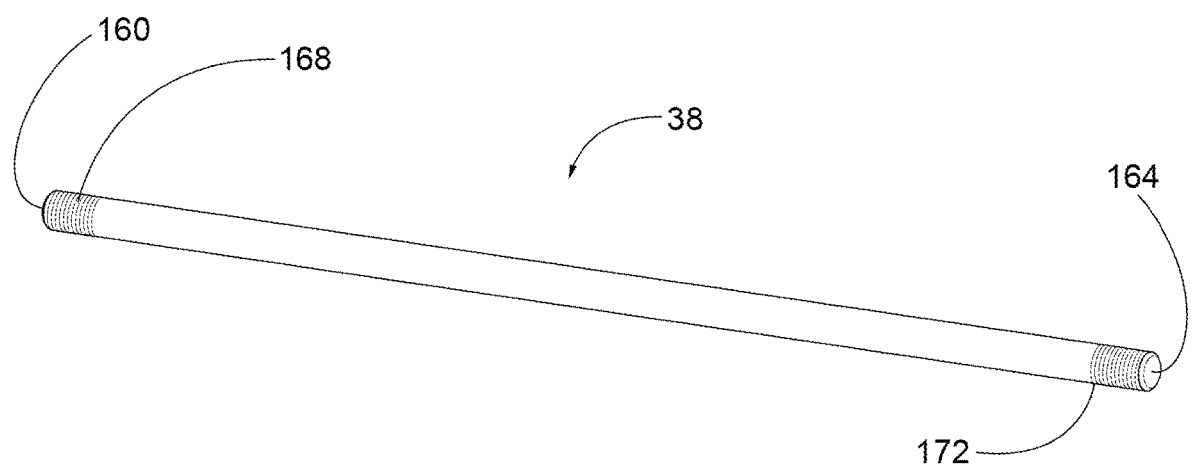
FIG. 11 is a perspective view of a tie rod of the integrated electro-hydraulic unit of FIG. 1.

As shown in FIG. 11, each tie rod 38 is substantially cylindrical and includes a first end 160 and a second end 164. Each tie rod 38 includes a plurality of first threads 168 at the first end 160 and a plurality of second threads 172 at the second end 164. In some constructions, the plurality of first threads 168 may be spaced from the first end 160, and the plurality of second threads 172 may be spaced from the second end 164.

Figure 12:
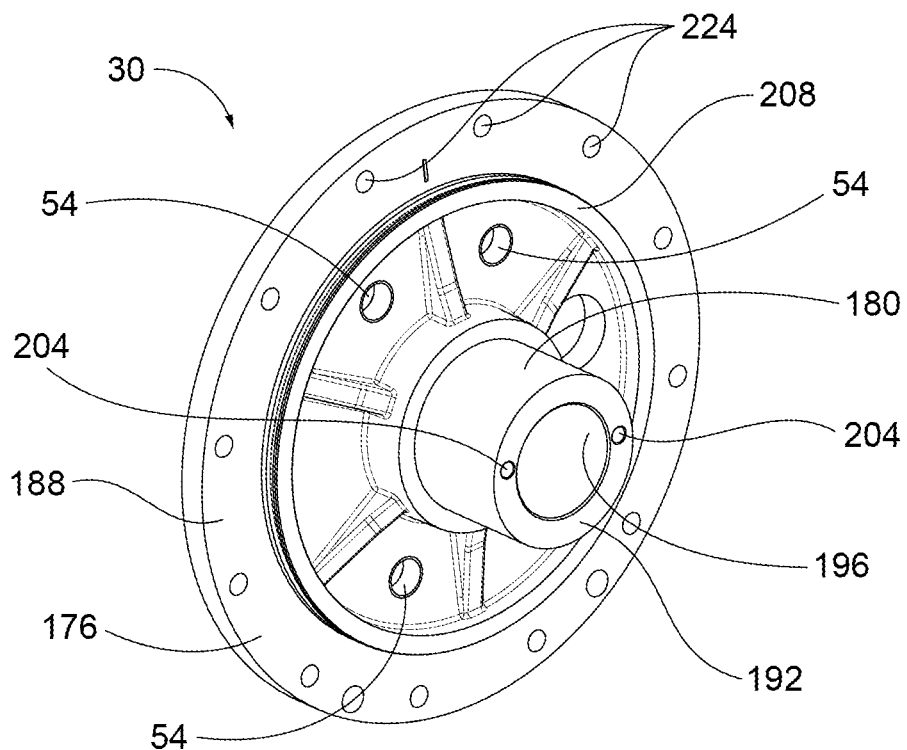
FIG. 12 is a rear perspective view of a front cap of the integrated electro-hydraulic unit of FIG. 1.
Figure 13:
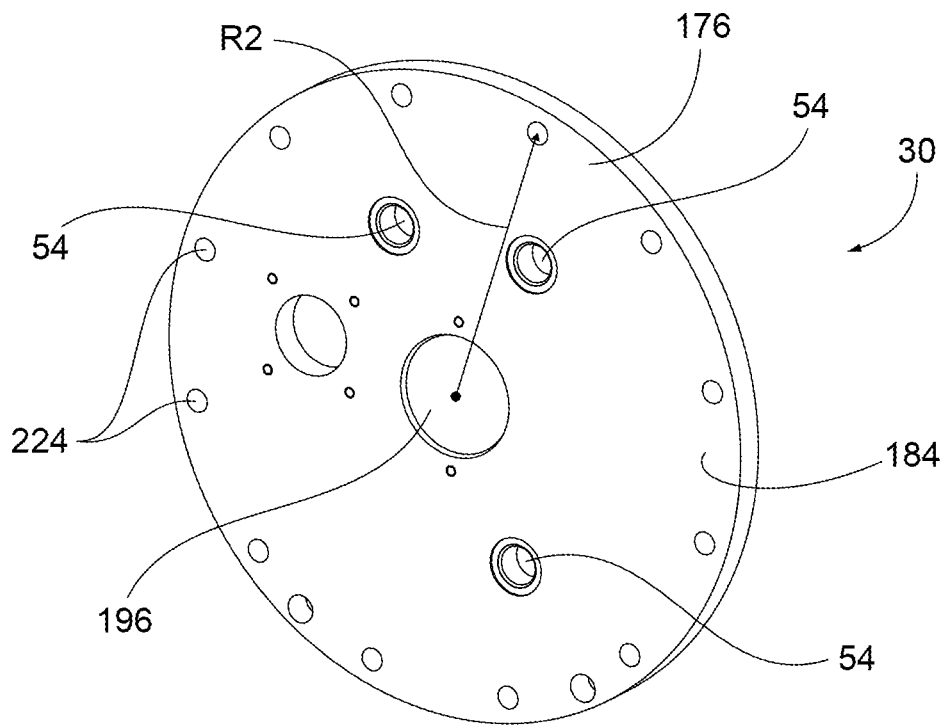
FIG. 13 is a front perspective view of the front cap of the integrated electro-hydraulic unit of FIG. 1.
Figure 14:
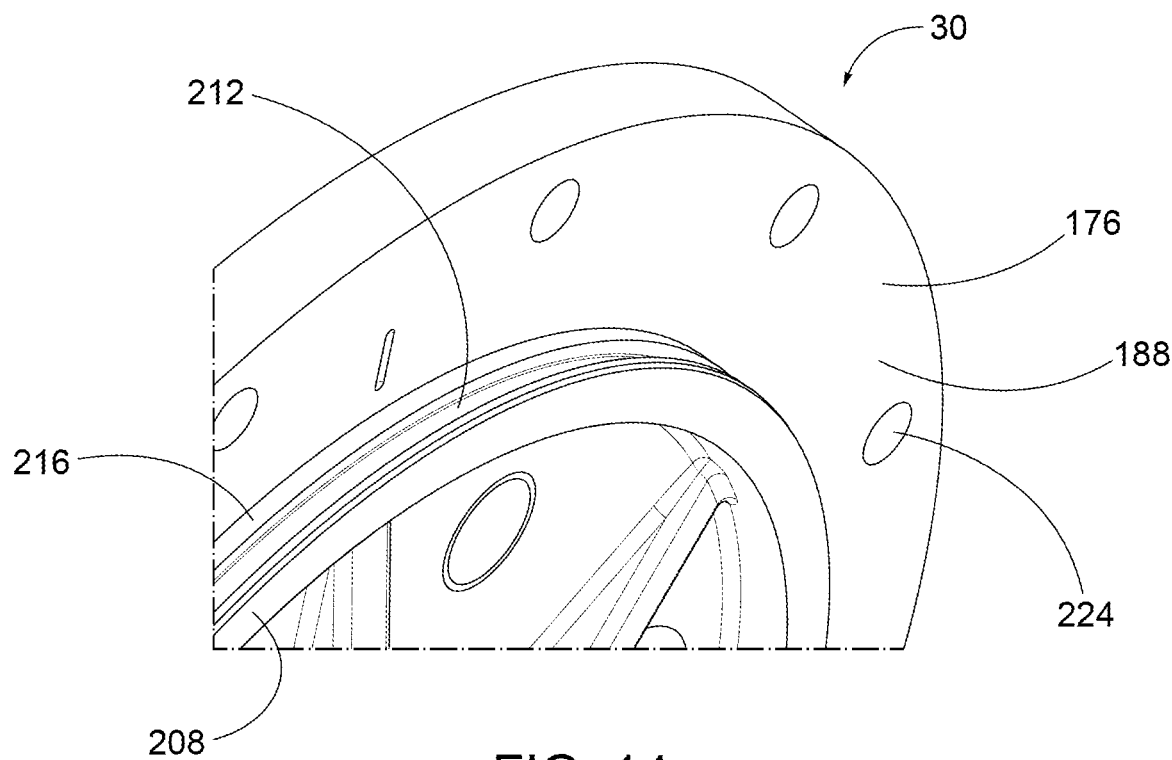
FIG. 14 is an enlarged rear perspective view of the front cap of the integrated electro-hydraulic unit of FIG. 1.

With reference to FIGS. 12-14, the front cap 30 includes a front plate 176 and a projection 180 extending from the front plate 176. In some constructions, the front cap 30 may be formed in its entirety as a single piece. In some constructions, the front cap 30 may be cast iron. The front plate 176 has the drain ports 54 and the electrical connection aperture 50. The front plate 176 is disk-shaped and has an outer axial surface 184 and an inner axial surface 188 opposite the outer axial surface 184. The outer axial surface 184 and the inner axial surface 188 are planar and perpendicular to the shared rotational axis A1. The front plate 176 extends radially outward from the projection 180. The projection 180 projects axially from the front plate 176 (e.g., projects axially from the inner axial surface 188). As illustrated in FIG. 4, the inner axial surface 188 of the front plate 176 abuts the first axial end 144 of the housing shell 26. As illustrated in FIG. 3, the projection 180 extends into the cavity defined by the housing shell 26 and directly contacts the swashplate 88.

Turning back to FIGS. 5, 12 and 13, the projection 180 defines a distal end 192 opposite from the front plate 176. The projection 180 has a hollow cylinder forming a portion of a central opening 196. The central opening 196 extends through both the projection 180 and the front plate 176. The central opening 196 receives one of the bearings 112 and a portion of the shaft 80, including a shaft portion that is received by that bearing 112. The bearing 112 received in the central opening 196 is supported by the projection 180. The projection 180 includes pin recesses 204 in the distal end 192. In some constructions, the projection 180 may only have a single pin recess 204 in the distal end 192. At least one pin 206 (FIG. 3) is positioned in at least one of the pin recesses 204 to lock the front cap 30 to the swashplate 88 such that the swash plate 88 is rotationally fixed. In some constructions, the swashplate 88 and/or the front cap 30 may be locked via a pin to the housing shell 26. In some constructions, the swashplate 88 may be locked via a tightening of the tie rods 38. In such constructions, the angular offset of the swash plate 88 may be adjusted before tightening of the tie rods 38 in order to optimize the reversal behavior of the electro-hydraulic unit 10. As illustrated, the front plate 176 and the projection 180 each have a circular cross-section perpendicular to the rotational axis A1. Further, the front plate 176 and the projection 180 are each coaxial with the rotational axis A1.

The front cap 30 also includes an annular ridge 208 extending from the inner axial surface 188 of the front plate 176. The annular ridge 208 is coaxial with the rotational axis A1. An annular recess 212 is formed in an outer circumferential surface 216 of the annular ridge 208. The annular recess 212 of the annular ridge 208 holds a first O-ring 220, or seal as shown in FIG. 6. The inner circumferential surface 152 of the housing shell 26 connects to the outer circumferential surface 216 of the annular ridge 208 such that the front cap 30 is radially centered on the rotational axis A1. The first O-ring 220 presses against annular ridge 208 and the inner circumferential surface 152 such that the front cap 30 and the housing shell 26 are fluidly sealed.

The front cap 30 further includes a plurality of first tie rod openings 224 extending through the front plate 176. The plurality of first tie rod openings 224 are angularly spaced around the rotational axis A1. Specifically, the plurality of first tie rod openings 224 are equally spaced around the rotational axis A1. Each of the plurality of first tie rod openings 224 is positioned at a second radius R2 on the front plate 176. The second radius R2 is greater than the first radius R1 defined by the housing shell 26. In the illustrated construction, the first tie rod openings 224 are through holes with constant diameters. In other constructions, the first tie rod openings 224 may include counterbores. Each of the first tie rod openings 224 receives a respective first end 160 of one of the tie rods 38. A plurality of first nuts 228 (see FIG. 1) are threaded onto the tie rods 38. Specifically, each respective first nut 228 is threaded onto the corresponding first threads 168 of a respective tie rod 38. The first nuts 228 are tightened onto the outer axial surface 184 of the front plate 176. In some constructions, the first nuts 228 may be nested in a counterbore of the first tie rod openings 224. In some constructions, the tie rods 38 may be screws with the screw heads replacing the plurality of first nuts 228.

Figure 15:
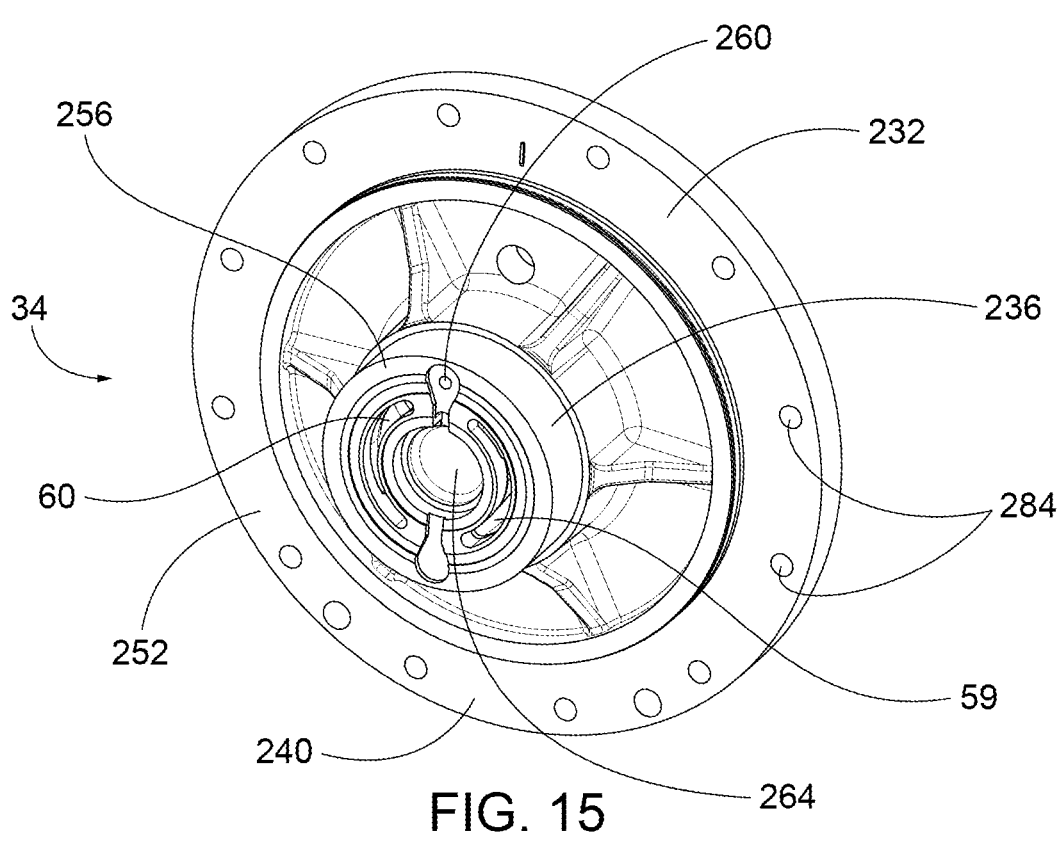
FIG. 15 is a rear perspective view of an end cap of the integrated electro-hydraulic unit of FIG. 1.
Figure 16:
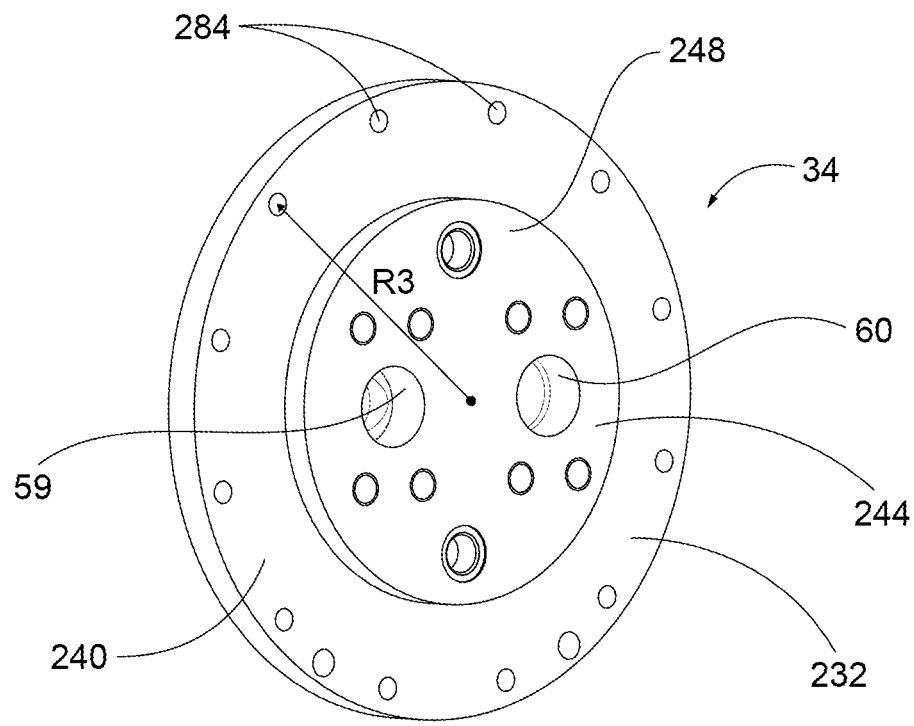
FIG. 16 is a front perspective view of the end cap of the integrated electro-hydraulic unit of FIG. 1.
Figure 17:
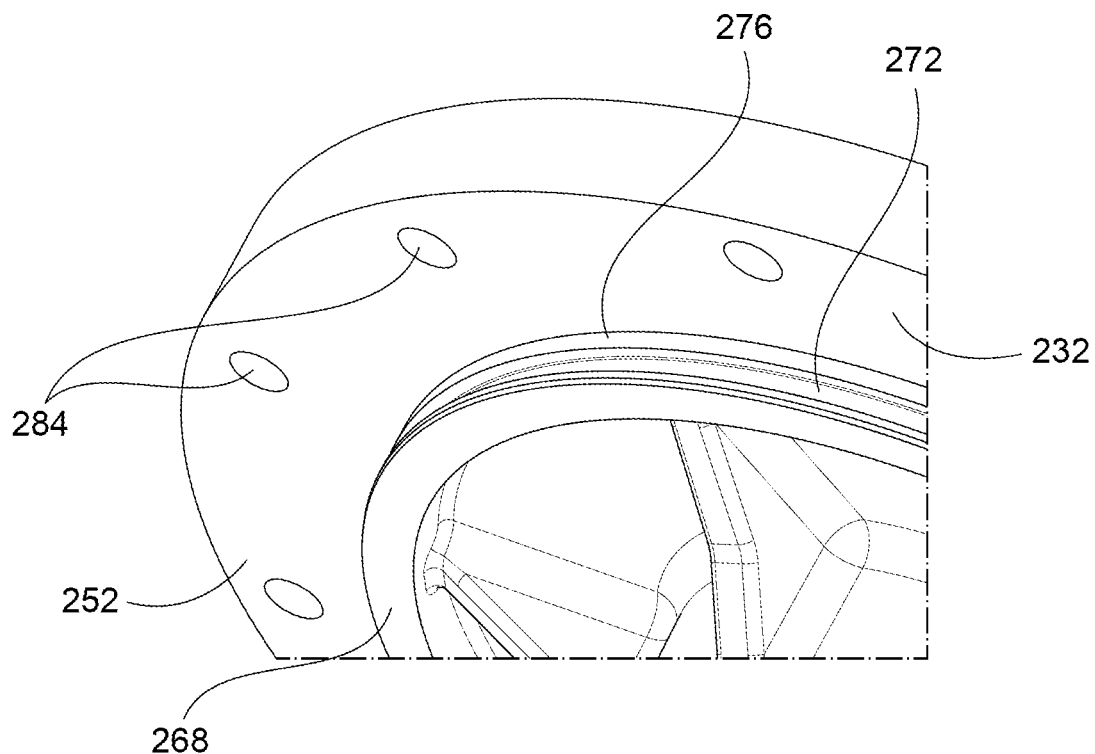
FIG. 17 is an enlarged rear perspective view of the end cap of the integrated electro-hydraulic unit of FIG. 1.

With reference to FIGS. 15-17, the end cap 34 includes an end plate 232 and a protrusion 236 extending axially from the end plate 232. The end plate 232 extends radially outward from the protrusion 236. In some embodiments, the end plate 232 and the protrusion 236 are formed together as a single piece. In other constructions, the end plate 232 and the protrusion 236 may be separate pieces. The end cap 34 is formed of cast iron such that the end cap 34 has a high load cycle resistance of the openings 59, 60. The end plate 232 includes a first disk portion 240 and a second disk portion 244 stacked on the first disk portion 240. The first fluid opening 59 and the second fluid opening 60 of the end cap 34 open into the second disk portion 244 of the end plate 232. Together, the first disk portion 240 and the second disk portion 244 define an outer axial surface 248 of the end plate 232. The first disk portion 240 defines an inner axial surface 252 of the end plate 232 opposite to the outer axial surface 248. The protrusion 236 projects axially from the inner axial surface 252 of the end plate 232 and defines a distal end 256 opposite from the end plate 232.

As shown in FIG. 4, the distal end 256 of the protrusion 236 abuts the valve plate 108. As illustrated in FIG. 15, the protrusion 236 includes a pin opening 260 in the distal end 256 configured to receive a pin which locks the valve plate 108 and the end cap 34 such that the valve plate 108 is rotationally fixed. In some constructions, the valve plate 108 and/or the end cap 34 may be locked via a pin to the housing shell 26. In some constructions, the valve plate 108 may be locked via a tightening of the tie rods 38. In such constructions, the angular offset of the valve plate 108 may be adjusted before tightening of the tie rods 38 in order to optimize the reversal behavior of the electro-hydraulic unit 10. As shown in FIGS. 4 and 15, the end cap 34 has a bearing recess 264 in the distal end 256 of the protrusion 236. The bearing recess 264 receives one of the bearings 112 such that the bearing 112 is seated in and supported by the protrusion 236. The shaft 80 extends into the protrusion 236 such that the bearing 112 receives a portion of the shaft 80 (e.g., an end portion thereof). The first fluid opening 59 and the second fluid opening 60 extend through the protrusion 236 and open into the distal end 256. The first fluid opening 59 and the second fluid opening 60 partially surround the bearing recess 264. The first fluid opening 59 and the second fluid opening 60 are positioned radially outward from the axis A1 relative to the bearing recess 264.

With reference to FIGS. 7 and 17, the end cap 34 includes an annular ridge 268 extending from the inner axial surface 252 of the end plate 232. The annular ridge 268 is coaxial with the rotational axis A1. An annular recess 272 is formed in an outer circumferential surface 276 of the annular ridge 268. The annular recess 272 of the annular ridge 268 holds a second O-ring 280, or seal. The inner circumferential surface 152 of the housing shell 26 connects to the outer circumferential surface 276 of the annular ridge 268 such that the end cap 34 is radially centered on the rotational axis A1. The second O-ring 280 presses against the annular ridge 268 and the inner circumferential surface 152 such that the end cap 34 and the housing shell 26 are fluidly sealed.

With reference to FIGS. 15-17, the end plate 232 includes a plurality of second tie rod openings 284. The second tie rod openings 284 are positioned on the first disk portion 240. The plurality of second tie rod openings 284 are angularly spaced around the rotation axis A1. Specifically, the plurality of second tie rod openings 284 are evenly spaced around the rotational axis A1. The number of second tie rod openings 284 is equal to the number of first tie rod openings 224. Each of the of second tie rod openings 284 is aligned with a respective one of the first tie rod openings 224. In the illustrated construction, the second tie rod openings 284 are through holes with constant diameters. In other constructions, the second tie rod openings 284 may include counterbores. Each of the plurality of second tie rod openings 284 is positioned at a third radius R3 on the end plate 232. The first radius R1 is smaller than the third radius R3. The third radius R3 is equal to the second radius R2. As a result, the tie rods 38 are radially outward from the housing shell 26 in relation to the shared rotational axis A1.

As illustrated in FIG. 2, each of the second tie rod openings 284 receives a respective second end 164 of one of the tie rods 38. A plurality of second nuts 288 are threaded on to the tie rods 38. Specifically, each respective second nut 288 is threaded onto a corresponding second thread 172 of a respective tie rod 38. The second nuts 288 are tightened onto the outer axial surface 248 of the end plate 232. In some constructions, the second nuts 288 may be nested in a counterbore of the second tie rod openings 284. In some constructions, the tie rods 38 may be screws with screw heads replacing the plurality of second nuts 288.

With reference to FIGS. 1 and 2, the plurality of first nuts 228 and the plurality of second nuts 288 are tightened on the plurality tie rods 38 such that the front cap 30, the end cap 34, and the housing shell 26 are axially compressed. In other words, the front cap 30 and the end cap 34 are secured together against axial separation by tension in the tie rods 38. As a result, the housing shell 26 is not responsible to carry axial separation loads between the front cap 30 and the end cap 34. Therefore, the housing shell 26 may be thinner material than a conventional housing for a similar size of machine (i.e., one having the same rating for pressure or power). The first thickness $t_1$ may be less than 1.25 cm, specifically less than 1.1 cm and more specifically less than 1.05 cm. In some embodiments, the first thickness $t_1$ is 1.015 cm. The second thickness $t_2$ may be less than 1.25 cm, specifically less than 1.1 cm, and more specifically less than 1.05 cm. In some embodiments, the second thickness $t_2$ is 1.035 cm. In some constructions, the housing shell 26 may have a uniform thickness. In some constructions, the uniform thickness may be less than 1.25 cm, specifically less than 1.1 cm, and more specifically less than 1.05 cm. In some constructions, the uniform thickness may be 1.035 cm. In some constructions, the uniform thickness may be 1.015 cm. In some constructions, the housing shell 26 is produced via continuous casting.

Further, the axial compression of the front cap 30, the end cap 34, and the housing shell 26 exerts an axial preload on both of the bearings 112 (e.g., through the shaft 80). The bearings 112 form a set of oppositely-angled tapered rolling element bearings to support the shaft 80 and cylinder block 76 for rotation with respect to the housing 22. The tie rods 38 are tensioned (e.g., by tightening of the nuts 228, 288) such that the axial preload is sustained in the presence of a housing pressure that pushes on the front cap 30 and the end cap 34. The distance between the front cap 30 and the end cap 34 defined by the length of the housing shell 26 creates an exact preload that increases the lifetime of the bearings 112 and resists pulsation of the electro-hydraulic unit 10.

After the initial tensioning of the tie rods 38, the presence of axial play due to manufacturing error can be detected. If axial play is detected, the washer 114 having a defined axial dimension may be added between one of the bearings 112 and the shaft 80. As a result, when the tie rods 38 are tensioned after insertion of the washer 114, the axial play is eliminated, and the above-described axial preload is achieved.

What is claimed is:
1. An integrated electro-hydraulic unit comprising:
a hydraulic machine including a rotary working group configured to pump a working fluid;
an electric machine encircling the hydraulic machine, the electric machine including a stator and a rotor coupled to the rotary working group such that the rotor drives the rotary working group about an axis; and
a housing at least partially surrounding the electric machine and the hydraulic machine, the housing including
a front cap having a front plate with a plurality of first tie rod openings,
an end cap having an end plate with a plurality of second tie rod openings,
a housing shell encircling the electric machine and positioned between the front cap and the end cap,
a plurality of tie rods, each tie rod having a first threaded end extending through a respective one of the plurality of first tie rod openings and a second end extending through a respective one of the plurality of second tie rod openings, and
a plurality of nuts threaded onto each of the first threaded ends of the plurality of tie rods and tightened onto the front cap such that the front cap, the end cap, and the housing shell are compressed via tension in the plurality of tie rods.

2. The integrated electro-hydraulic unit of claim 1, wherein the housing shell includes a first axial end that abuts the front cap and a second axial end opposite the first axial end, and wherein the second axial end abuts the end cap.

3. The integrated electro-hydraulic unit of claim 1, wherein the housing shell is a hollow cylinder.

4. The integrated electro-hydraulic unit of claim 1, wherein the hydraulic machine includes a shaft rotatable about the axis and a bearing at least partially supporting the shaft, wherein the bearing is supported on the front cap of the housing, and wherein the compression of the front cap, the end cap, and the housing shell exerts an axial preload on the bearing.

5. The integrated electro-hydraulic unit of claim 1, wherein the hydraulic machine and the electric machine define a shared rotational axis, and wherein the tie rods are radially outward from the housing shell in relation to the shared rotational axis.

6. The integrated electro-hydraulic unit of claim 5, wherein the tie rods are evenly spaced around an entirety of the shared rotational axis.

7. An integrated electro-hydraulic unit comprising:
a hydraulic machine including a rotary working group configured to pump a working fluid;
an electric machine encircling the hydraulic machine, the electric machine including a stator and a rotor coupled to the rotary working group such that the rotor drives the rotary working group about an axis; and
a housing at least partially surrounding the electric machine and the hydraulic machine, the housing including
a front cap having a front plate defining a first outer axial surface and a first inner axial surface opposite the first outer axial surface,
an end cap having an end plate defining a second outer axial surface and a second inner axial surface opposite the second outer axial surface, the second inner axial surface facing the first inner axial surface of the front cap,
a housing shell extending between the front cap and the end cap, the housing shell having a first axial end abutting the first inner axial surface and a second axial end abutting the second inner axial surface, and
a plurality of tie rods extending from a plurality of first tie rod openings in the front cap to a plurality of second tie rod openings in the end cap,
wherein the plurality of tie rods are tensioned between the front cap and the end cap such that the end cap, the front cap, and the housing shell are compressed.

8. The integrated electro-hydraulic unit of claim 7, wherein the housing shell defines an inner circumferential surface extending from the first axial end to the second axial end, and wherein the front cap has a first annular ridge extending from the first inner axial surface, and wherein the inner circumferential surface of the housing shell centers the first annular ridge on the axis.

9. The integrated electro-hydraulic unit of claim 8, wherein the first annular ridge has a first annular groove, wherein a first seal is positioned in the first annular groove, and wherein the first seal contacts the first annular ridge and the inner circumferential surface such that the housing shell and the front cap are fluidly sealed.

10. The integrated electro-hydraulic unit of claim 9, wherein the end cap has a second annular ridge extending from the second inner axial surface, and wherein the inner circumferential surface of the housing shell centers the second annular ridge on the axis.

11. The integrated electro-hydraulic unit of claim 10, wherein the second annular ridge has a second annular groove, wherein a second seal is positioned in the second annular groove, wherein the second seal contacts the second annular ridge and the inner circumferential surface such that the housing shell and the end cap are fluidly sealed.

12. The integrated electro-hydraulic unit of claim 7, wherein the electric machine includes a bearing which supports a shaft and which is positioned on the front cap, and wherein the compression of the front cap, the end cap, and the housing shell exerts an axial preload on the bearing.

13. An integrated electro-hydraulic unit comprising:
an electric machine including a stator and a rotor,
a hydraulic machine including
a shaft,
a bearing supporting the shaft,
a cylinder block driven about an axis by the rotor and coupled to the shaft,
a plurality of pistons received in the cylinder block,
a swashplate configured to axially move the plurality of pistons, and
a valve plate including a plurality of ports, the plurality of ports including a first port and a second port, each of the first and second ports are configured to exchange a working fluid with the cylinder block by action of the plurality of pistons; and
a housing having
a front cap having a front plate and a projection extending from the front plate, the projection defining a projection distal end which abuts the swashplate,
an end cap having an end plate and a protrusion extending from the end plate, the protrusion defining a protrusion distal end in which a bearing recess is formed, and
a housing shell encircling the electric machine and sandwiched between the front cap and the end cap,
wherein the bearing is positioned in the bearing recess of the protrusion such that the protrusion supports the bearing and the shaft, and
wherein a plurality of tie rods are tensioned on the front cap and the end cap such that the end cap, the front cap, and the housing shell are compressed.

14. The integrated electro-hydraulic unit of claim 13, wherein the bearing is a first bearing and the hydraulic machine includes a second bearing supporting the shaft, and wherein the projection of the front cap includes a central opening which receives the second bearing.

15. The integrated electro-hydraulic unit of claim 13, wherein the projection of the front cap includes a pin recess in the projection distal end, and wherein a pin is positioned in the pin recess and in the swashplate such that the swashplate is rotationally fixed.

16. The integrated electro-hydraulic unit of claim 13, wherein the protrusion of the end cap has a pin recess in the protrusion distal end, and wherein a pin is positioned in the pin recess and in the valve plate such that the valve plate is rotationally fixed.

17. The integrated electro-hydraulic unit of claim 13, wherein the compression of the front cap, the end cap, and the housing shell exerts an axial preload on the bearing.

18. The integrated electro-hydraulic unit of claim 17, wherein a washer is positioned between a portion of the shaft and the bearing such that the shaft is placed at a defined axial position relative to the bearing.

19. The integrated electro-hydraulic unit of claim 13, wherein the end cap includes a first fluid opening and a second fluid opening, and wherein the first fluid opening and the second fluid opening open into the distal end of the protrusion and partially surround the bearing recess.

* * * * *